Patented June 15, 1954

2,681,124

UNITED STATES PATENT OFFICE 2,681,124

CYCLONE SEPARATOR

Hendrik van der Kolk, Heemstede, Netherlands

Application October 29, 1951, Serial No. 253,740

Claims priority, application Netherlands
November 14, 1950

2 Claims. (Cl. 183—84)

My present invention relates to a cyclone of the ordinary type comprising a cylindrical or slightly conical upper part provided with a tangential or axial inlet for the suspension to be treated and with a central outlet for the continuous phase of said suspension, said upper part merging into a downwardly tapering, conical lower part having a central bottom aperture giving access to a bunker for collecting the disperse phase of the suspension. The suspension may be a suspension of dust or minute drops in gas, or a suspension of small solid particles in a liquid, but for convenience I shall simply refer to dust laden gas both in this specification and in the appended claims.

It is well known that the vertex angle of the conical lower part of such a cyclone should be small in order that the dust may be efficiently separated from the gas. The reason is that the centrifugal force to which a dust particle is subjected when whirling across the conical surface has an upward component, whose magnitude is proportional both to said force and to the sine of half the vertex angle of the cone. Consequently, said particle will, under the influence of gravity, move downward across the conical surface along a spiral path at a velocity that is lower as the vertex angle is smaller. That is to say, if the magnitude of said angle, and, thereby, the said upward component exceeds a predetermined value, then, as the particle descends so that the centrifugal force to which it is subjected increases owing to the decrease of the radius of curvature of the conical surface, an equilibrium will be established between the forces acting upon the particle. As a consequence the particle will then simply follow a circular path in a plane at right angles to the axis of the cone, and this increases the chance for the particle to strike against the wall and thereby be caught by the rising vortex so as to be discharged through the gas outlet.

However, reducing the vertex angle of the cone increases the total height of the cyclone and, thereby, the space occupied by the latter. Besides, increased length of the cyclone often entails increased height of the supporting structure and increased length of the supply and discharge pipes.

In view of the said drawbacks it has already been proposed to do away with the conical lower part of the cyclone, so that the upper part has a flat, horizontal bottom with a central dust discharge opening. Although cyclones of this type may operate satisfactorily, they sometimes give rise to trouble. If, namely, the dust bunker is not emptied in time, the dust may accumulate in the cyclone itself and this dust cannot be discharged through the dust discharge opening of the cyclone, since it forms a heap upon the said flat, horizontal bottom, so that it cannot flow by gravity into the bunker, and neither can the gas eddying above said heap impart the required movement to the dust. Under these conditions it is necessary to open the cyclone to remove the dust, but in plants comprising a great number of small cyclones this cleaning operation is laboriously slow and objectionable, especially when the gas is hot.

The invention renders it possible not only to avoid the necessity of providing the cyclone with a slim lower part and yet prevent accumulation of dust in the cyclone, but also to ensure efficient dust separation. The invention resides herein that the upper part of the cyclone merges into a lower part in the form of a short cone having a vertex angle of the order of 60–90°, and that the lower portion of the wall of the upper part, or the wall of the conical lower part, is provided with at least one substantially tangential slot giving access to the bunker either directly or through a conduit. Through said slot the dust, carried by a certain amount of gas, is discharged into the bunker.

As a matter of course, said gas should thereafter be discharged from the bunker, so that, generally speaking, the bunker should permanently communicate with the cone through the bottom opening thereof. So, the sectional area of said opening should be relatively small, otherwise the gas returning from the bunker to the cyclone would carry along an appreciable amount of dust. It will be understood that, owing to the small diameter of the said opening, the centrifugal force acting upon the dust in the vicinity of said aperture will be relatively great and thus prevent the dust from escaping. As an alternative, I suggest providing, a small distance below said opening, a baffle preventing the gas in the bunker from returning to the cyclone in the form of an axial flow.

In case the gas flowing into the bunker is directly drawn therefrom and discharged into a space outside the cyclone, the bottom opening of the cone may be held closed during normal operation. If, under these conditions, the bunker should not have been emptied in time so that dust accumulates in the cyclone, it is only necessary, after emptying the bunker, to open the said bottom opening to cause the dust to flow from the cyclone into the bunker. As a matter of course, therefore, the vertex angle of the cone should not exceed a predetermined maximum lest the dust be prevented from sliding downhill on the conical surface.

Figure 1:
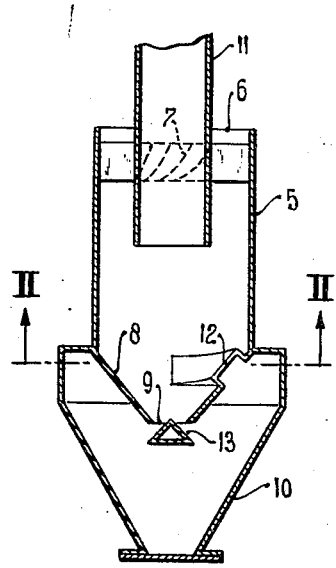
Fig. 1 illustrates a cyclone in accordance with the invention in a section along the line I—I in Fig. 2, which shows a section along the line II—II in Fig. 1.
Figure 2:
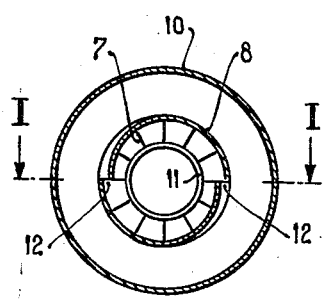

In Figs. 1 and 2, the cylindrical upper part of the cyclone is designated by 5, the axial inlet for the dust laden gas by 6, the series of blades for imparting rotary movement to said inflowing gas by 7, the conical lower part by 8, the central bottom opening of the cone by 9, the dust bunker by 10 and the outlet for the clean gas by 11.

In accordance with the invention, the wall of the cone 8 is provided, close to the upper part 5, with two tangential slots 12, which directly open into the bunker 10. Provided a small distance below the opening 9 is a baffle in the form of a small, upwardly tapering cone 13 leaving an annular gap between itself and the edge of said opening.

The cyclone just described operates in the same manner as known cyclones of this type. That is to say, rotary movement is imparted to the dust laden gas supplied as at 6, so that the dust, under the influence of the centrifugal force, moves towards the wall of the upper part 5. In addition, said dust is caused to descend owing to gravity and to the downward flow of the gas along the said wall. Dust particles reaching the wall of the upper part 5 are discharged, together with some gas, through the slots 12 into the bunker 10. To reach the aperture 9, said gas is compelled to flow around the cone 13, so that it is prevented from carrying along an appreciable amount of dust to the cyclone.

It will be appreciated that in certain cases only one slot 12 will do, and also that a greater number of slots than two may be provided. The exact location of said slots depends upon the size of the dust particles. If desired, the slots in the cone may be arranged at different levels.

As to the cone 13, this may be mounted for vertical adjustment, so that it may be used for closing the opening 9.

Figure 3:
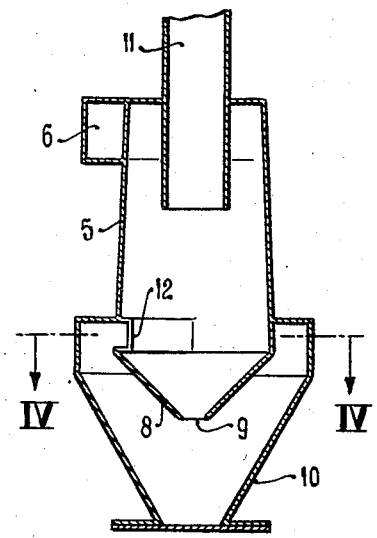
Figs. 3 and 4 are sectional views, corresponding to those shown in Figs. 1 and 2, respectively, of a second embodiment of the invention.
Figure 4:
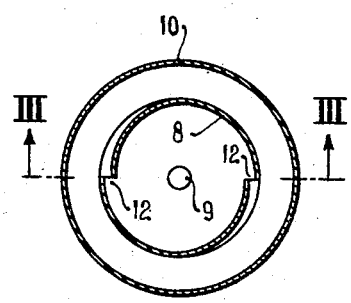

In Figs. 3 and 4, the parts equivalent to those shown in Figs. 1 and 2 are indicated by the same reference numerals. As shown in Figs. 3 and 4, the upper part 5 has a slight upward taper and a tangential instead of an axial inlet 6. The dust outlet slots 12 extend to the lower edge of part 5, which, in view thereof, projects through a certain distance into the bunker 10. The baffle 13, shown in Fig. 1, is missing, but the opening 9 has an appreciably smaller diameter than the one shown in said figure, whereby the effect referred to in the sixth paragraph of this specification is realized.

It is, however, not strictly necessary for the upper part 5 of the cyclone illustrated in Figs. 3 and 4 to project into the dust bunker 10. Also in the cyclone illustrated in Figs. 1 and 2, whose upper part does not project into the bunker, the slots 12 could be provided in the wall of the upper part 5 and extend to the lower edge thereof, in which case they should communicate with the bunker through suitable ducts.

What I claim is:

1. A cyclone comprising a vertical body having a cylindrical upper portion and a lower inverted conical portion having an outlet opening in its apex and having a vertex angle in the angular range of exactly 60–90°, a dust bunker concentric with and radially spaced outward from the body and enclosing the lower portion of the body, and having an upper end formed with a radial, inward flange connected to the body, said body having at least one tangential dust outlet channel vertically formed therein at the juncture of the lower portion with the upper portion, said channel communicating with the dust bunker and being spaced at its lower end from the apex of the lower portion and having its upper end disposed adjacent the flange.

2. A cyclone as claimed in claim 1, wherein an upwardly tapering cone is provided vertically below and in concentric relation with the said outlet opening, the base of said cone having a diameter exceeding that of said outlet opening.

References Cited in the file of this patent

UNITED STATES PATENTS

| Number | Name | Date |
|---|---|---|
| 415,368 | Rietz | Nov. 19, 1889 |
| 734,627 | Southerland | July 28, 1903 |

FOREIGN PATENTS

| Number | Country | Date |
|---|---|---|
| 20,481 | Finland | Aug. 27, 1945 |
| 119,868 | Australia | Apr. 23, 1945 |
| 460,336 | Germany | May 23, 1928 |
| 887,574 | France | Aug. 16, 1943 |
| 947,478 | France | Jan. 10, 1949 |
| 956,552 | France | Aug. 15, 1949 |